United States Patent
Puretic

[11] 3,913,254
[45] Oct. 21, 1975

[54] FISH HANDLING DEVICE

[76] Inventor: Mario J. Puretic, 259-6th Ave. North, Tierra Verde, Fla. 33715

[22] Filed: Aug. 12, 1974

[21] Appl. No.: 496,446

Related U.S. Application Data

[63] Continuation-in-part of Ser. No. 380,820, July 19, 1973, abandoned.

[52] U.S. Cl. ........................................ 43/6.5; 43/65
[51] Int. Cl.² ........................................ A01K 81/04
[58] Field of Search ....... 43/6.5, 13; 37/190, 191 R, 37/192 R, 55; 61/21

[56] References Cited
UNITED STATES PATENTS

| | | | |
|---|---|---|---|
| 1,256,390 | 2/1918 | Stuart | 198/12 |
| 1,486,485 | 3/1924 | Frissell | 43/6.5 |
| 1,717,835 | 6/1929 | Calhoun | 43/6.5 |
| 3,124,890 | 3/1964 | Puretic | 43/6.5 |
| 3,775,890 | 12/1973 | Puretic | 43/6.5 |
| 3,838,534 | 10/1974 | Barr | 43/6.5 |

*Primary Examiner*—Louis G. Mancene
*Assistant Examiner*—Peter K. Skiff
*Attorney, Agent, or Firm*—Fulwider Patton Rieber Lee & Utecht

[57] ABSTRACT

A fish handling device for lifting fish upwardly out of a fish net or boat hold. The device includes a frame which carries an endless belt. The belt is provided with a plurality of baskets and the lower portion of the belt extends into the water. Rotation of the roller causes the baskets to collect and then raise the fish. The device is readily compacted for stowage.

12 Claims, 14 Drawing Figures

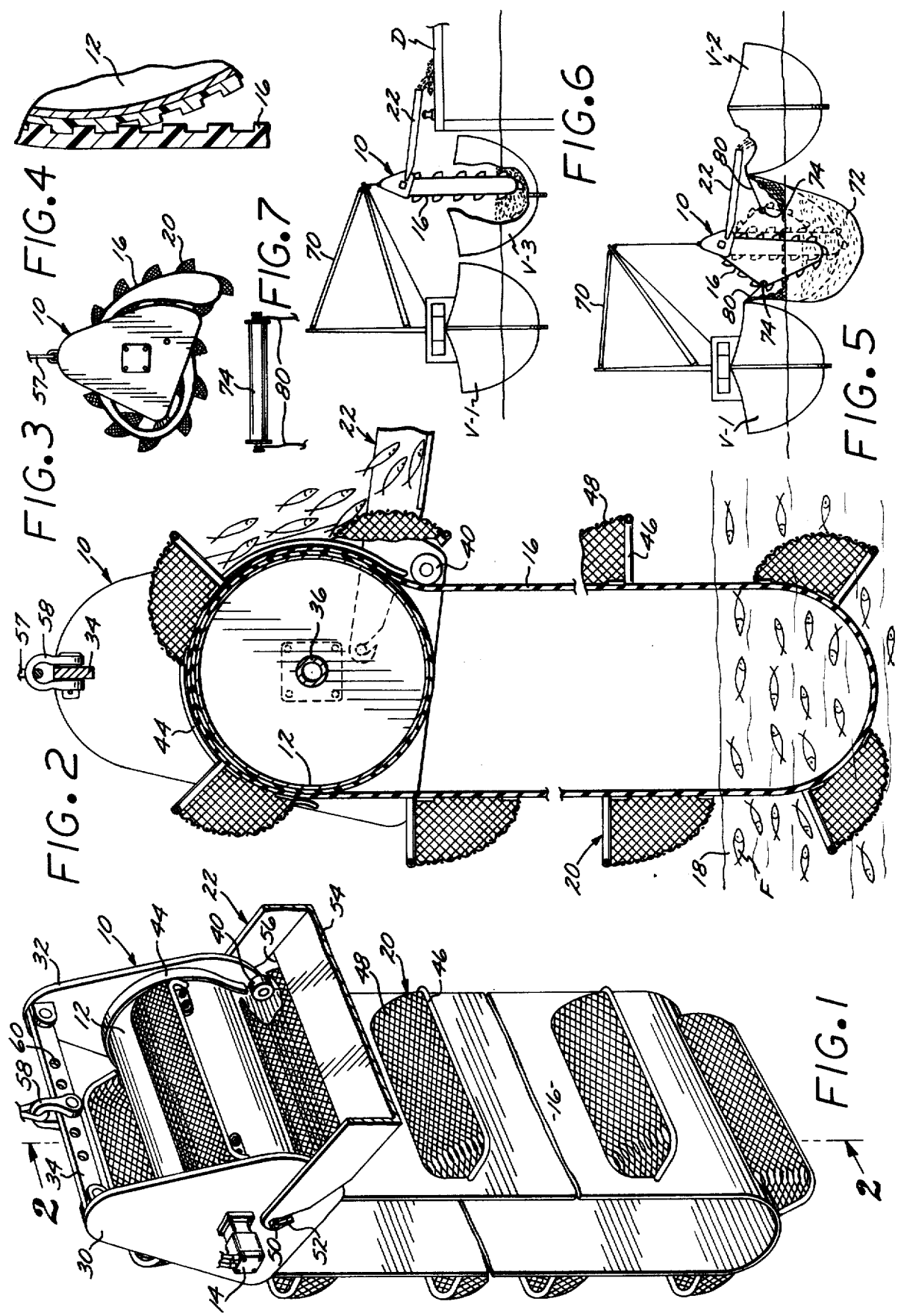

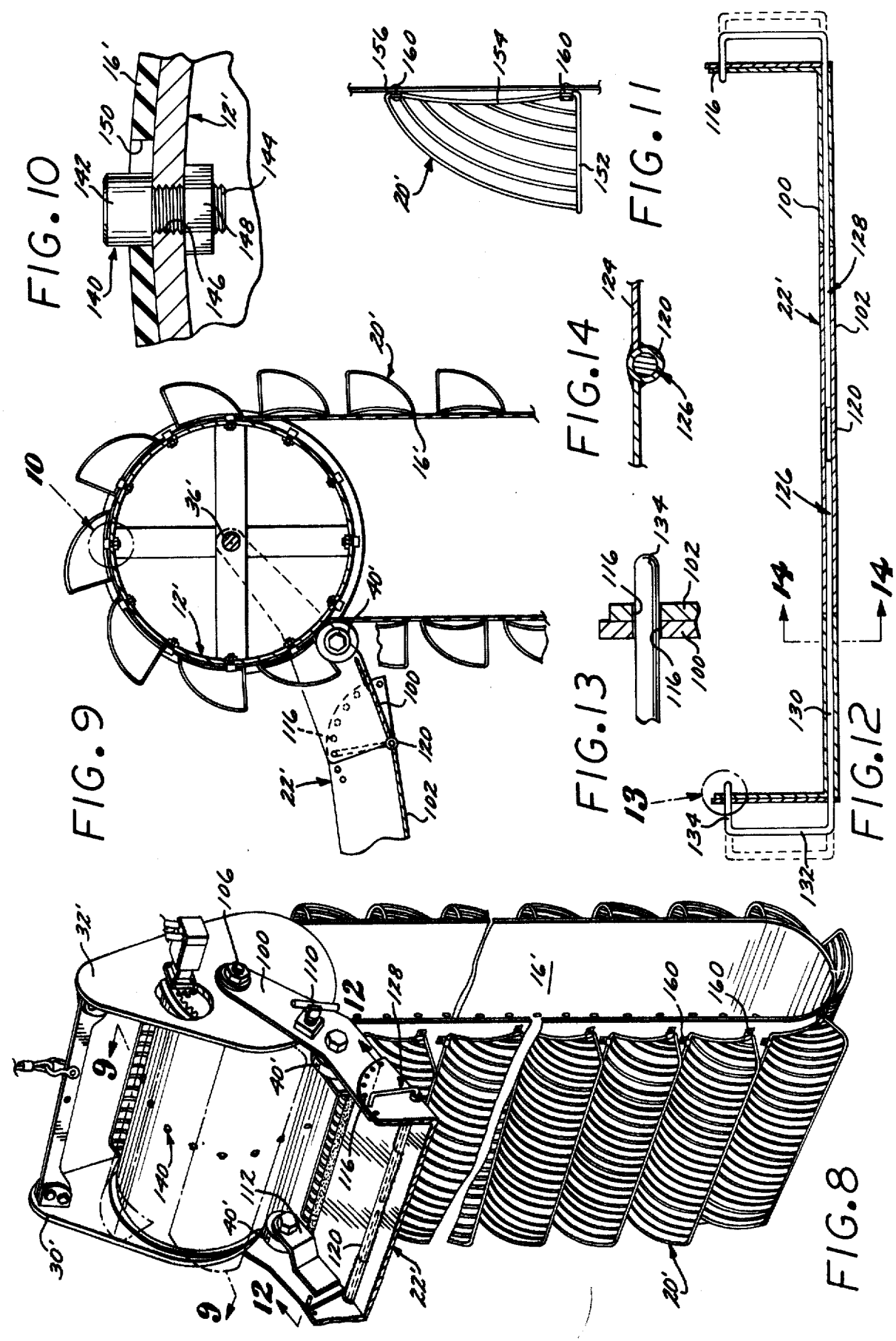

FISH HANDLING DEVICE

CROSS-REFERENCE TO RELATED APPLICATION

This application is a continuation-in-part of my application Ser. No. 380,820 filed July 19, 1973 now abandoned.

BACKGROUND OF THE INVENTION

1. Field of the Invention

The present invention relates generally to the art of fishing and more particularly to a novel arrangement for recovering fish from a net and transferring such fish onto a fishing boat. The fish handling device of the present invention may also lift fish out of a boat hold.

2. Description of the Prior Art

Although fishing is one of the oldest arts, comparatively little has been done over the years to change apparatus and methods that have been utilized in the fishing art for centuries. A fundamental and novel advance in the art of fishing is disclosed in my U.S. Pat. Nos. 2,733,530 and 2,733,531, issued Feb. 7, 1956. These patents relate to an apparatus and method for drawing a net alongside a fishing boat by means of a power-driven block suspended from a boom on the boat. The use of such power-driven block has greatly expedited the hauling-in of the net alongside the boat, and it has been possible in many cases to substantially reduce the number of men required for a commercial fishing boat crew. Although the use of such power-driven block permits the netted fish to be brought alongside the fishing boat in a minimum period of time, there still remains the difficult problem of recovering the fish from the net and transferring such fish into the hold of the fishing boat.

It is conventional to scoop smaller netted fish from the net by means of small scoops or dip nets, each manipulated by a fisherman. Each dip net handles only a maximum load of about thirty pounds. Thus, the conventional brailing operation is seen to be a time-consuming, tedious job requiring tremendous strength. Alternatively, the netted fish may be pumped into a fishing boat. This system, however, renders the fish generally unfit for human consumption.

SUMMARY OF THE INVENTION

Applicant is the inventor of the U.S. Pat. No. 3,124,890 issued Mar. 17, 1964 directed to conveyor apparatus for removing fish from a net and loading such fish into a fishing boat. Although the conveyor apparatus shown in my aforedescribed U.S. Pat. No. 3,124,890 affords improved results over the conventional scooping of fish from a net onto a fishing boat, the conveyor belt shown in such patent can occasionally damage the fish. The fish handling device of the present invention eliminates any danger of fish damage. Additionally, the fish handling device of the present invention is more efficient and foolproof in use than my prior conveyor apparatus.

Another important advance in the art of fishing is disclosed in my U.S. Patent application Ser. No. 228,515 filed Feb. 23, 1972, now U.S. Pat. No. 3,775,890. That apparatus utilizes a rigid open-sided enclosure that houses a plurality of fish-moving baskets. The upper portion of the enclosure is open to define a fish-discharge through the open lower sides thereof. The fish handling device of the present invention differs from my earlier apparatus of U.S. Pat. No. 3,775,890 primarily in that such device is lighter in weight and can be readily compacted for stowage when not in use.

Other important advantages of the fish handling device of the present invention are that it is economical of manufacture, affords safety for the fishing boat crew, and lends itself to traditional fishing methods.

A further object of the present invention is to provide a fish handling device of the aforedescribed nature that incorporates unique force-transfer means between the conveyor belt and its driving roller.

Yet a further object of the present invention is to provide a fish handling device of the aforedescribed nature that utilizes a fish-receiving chute which may be readily adjusted as to its position relative to such device, with such chute being easily removed for stowage.

BRIEF DESCRIPTION OF THE DRAWINGS

FIG. 1 is a broken perspective view of a preferred form of fish handling device embodying the present invention;

FIG. 2 is a vertical sectional view taken along line 2—2 of FIG. 1, but showing said fish handling device in operation;

FIG. 3 is a reduced front elevational view showing how said fish handling device may be compacted for stowage;

FIG. 4 is a fragmentary vertical sectional view showing a belt driving arrangement usable with the fish handling device of the present invention;

FIG. 5 is a further reduced front elevational view showing how the fish handling device of the present invention may be employed in a fish loading operation;

FIG. 6 is a front elevational view similar to FIG. 5 showing how the fish handling device of the present invention may be employed in unloading fish from a fishing boat hold;

FIG. 7 shows an auxiliary roller usable with said fish handling device;

FIG. 8 is a broken perspective view of a modified form of fish handling device embodying the present invention;

FIG. 9 is a broken vertical sectional view taken on line 9—9 of FIG. 8;

FIG. 10 is an enlarged view of the encircled area designated 10 in FIG. 9; and

FIG. 11 is a side elevational view in enlarged scale showing a fish-moving basket utilized in the device of FIG. 8;

FIG. 12 is a vertical sectional view taken in enlarged scale along line 12—12 of FIG. 8

FIG. 13 is an enlarged view of the encircled area designated 13 in FIG. 12; and

FIG. 14 is a vertical sectional view taken on line 14—14 of FIG. 12.

DESCRIPTION OF THE PREFERRED EMBODIMENT

Referring to the drawings, a preferred form of fish handling device embodying the present invention includes a frame, generally designated 10, which rotatably supports a roller 12. A hydraulic motor 14 or other power-operated means is supported by the frame 10 to rotate roller 12. An endless belt 16 of a suitable rubber or synthetic plastic is drivingly looped about roller 12 and depends therefrom so that its lower portion extends into a fish-containing space such as a body of water 18 from which fish F are to be lifted. A plurality of fish-moving baskets, generally designated 20, are attached to belt 16 at spaced points along the belt. A chute, generally designated 22, is pivotally supported by frame 10. As indicated in FIG. 2, rotation of roller 12 causes the fish-moving baskets 20 to descend into the water 18 so as to continously collect and then raise netted fish F out of the water and onto the upper end of chute 22.

More particularly, frame 10 includes a pair of like aligned plates 30 and 32 which are interconnected at their upper ends by a rigid crosspiece 34. Roller 12 is supported upon a horizontal shaft 36 journaled by frame plates 30 and 32. The hydraulic motor 14 is affixed to the outside of plate 30 and is keyed to shaft 36 so as to rotate such shaft and thereby the roller 12. The endless belt 16 carried by roller 12 is urged into driving engagement with such roller by means of a pair of idler rollers 40 (only one of which is shown) carried by the lower portion of plates 30 and 32 on the inner surfaces of such plates. The outer portions of belt 16 are covered by a pair of arcuate shields 44 affixed to the interior surfaces of plates 30 and 32 as such belt passes around roller 12.

Baskets 20 are of like construction and each include a rigid generally U-shaped hoop 46 which extends substantially normally from the outer surface of belt 16. Mesh or netting 48 extends from the hoops 46 rearwardly to the outer surface of the belt 16 so as to cooperate with the U-shaped hoops in defining the baskets. It will be noted that the corners of hoops 46 are rounded so as to preclude snagging of a fish net.

The chute 22 has its upper end removably pivotally attached to a pair of pivot pins 50 affixed to the outer surfaces of the frame plates 30 and 32, such pivot pins being received within slots 52 formed in the upper end of the chute. The bottom wall 54 of chute 22 is formed with a rectangular opening 56 spaced outwardly of the baskets 20.

The frame 10 and its belt 16 may be supported by a cable 57 or the like secured to a conventional shackle 58. The shackle 58 is disposed within one of a plurality of bores 60 formed in crosspiece 34.

Referring now to FIG. 2, in the operation of the aforedescribed fish handling device, the frame 10 is suspended over the body of water 18 containing the fish F with the lower portion of the belt 16 submerged. The hydraulic motor 14 is then actuated so as to rotate roller 12. Rotation of the roller 12 in turn effects lineal movement of the belt 16 and its attached baskets 20. It will be apparent that as the baskets 20 move down the right-hand side of belt 16 and enter the water 18 such baskets will scoop up fish F. Thereafter, the fish F will be raised by the baskets 20 along the left-hand side of the belt. As the baskets 20 move over the roller 12 to the righthand portion thereof, the fish F will be dumped from the baskets onto the chute 22. The discharge end of chute 22 will be arranged at a desired location, as for example, over the deck of a fishing vessel or receiving dock.

With continued reference to FIG. 2, it is important to observe that the axial spacing of baskets 20 on belt 16 is such that a basket will cover the chute opening 56 during the time fish are being dumped from the immediately following basket. It is an important advantage of the fish handling device of the present invention that the fish are not damaged during the lifting operation. Hence, such fish can even be used for live bait.

Referring now to FIG. 3, the fish handling device of the present invention may be readily compacted into a small bundle by simply wrapping the belt 16 around the roller 12. As compacted, such fish handling device may be conveniently stowed on the deck of a fishing vessel, or alternatively, it may be left suspended from cable 57 as shown in this figure.

Referring now to FIG. 4, the roller 12 and belt 16 may be formed with complementary grooves where heavy loads of fish are being lifted.

Referring now to FIG. 5, although the aforedescribed fish handling device may be employed to load fish onto a single vessel, it also lends itself to use with two fishing vessels. Thus, in FIG. 5, the first fishing vessel V-1 is provided with a boom structure 70 from which the fish handling device is suspended by cable 57. The chute 22 has its discharge end positioned over a second fishing vessel V-2. A fish-containing net 72 is suspended between the vessels V-1 and V-2. Optionally, the first fishing vessel V-1 and/or the second fishing vessel V-2 may be provided with an idler spool 74 shown particularly in FIG. 7, which engages the underside of the belt 16 to spread such belt out of its normal configuration. Spool 74 has its ends carried by lanyards 80 secured to the fishing vessels. The use of one or both spools 74 permits the belt configuration to be adjusted to accommodate the depth, width and contour of fish net 72 in accordance with varying wind and sea conditions. The use of two spools also restrains the fish handling device against swinging movement. It will be understood that when the fishing vessel V-2 has been loaded, it may be moved from its position alongside vessel V-1 and another empty fishing vessel substituted therefor to receive fish from the net 72.

Referring now to FIG. 6, the fish handling device of the present invention is shown unloading fish from the hold of a fishing vessel V-3 onto a fish-receiving dock D. The hold may be unloaded in the manner either dry or while it contains water. With this arrangement fish may be unloaded much faster and with far less effort than required by the conventional use of hoisting buckets or baskets.

Referring now to FIGS. 9–12, there is shown a modified form of fish handling device embodying the present invention. The modified form of the device is generally similar to that shown in FIGS. 1–5 and accordingly, like parts bear primed reference numerals. It will noted, however, that the fish-receiving chute, generally designated 22', is articulated and is defined by a receiving portion 100 and a discharging portion 102. It will also be noted that the fish-moving baskets, generally designed 20' are of somewhat different construction than the aforedescribed fish-moving baskets 20. The modified form of the device further includes an improved arrangement for transferring force from the power-driven roller 12' to the endless belt 16'.

More particularly, the chute receiving portion 100 is pivotally connected at its upper end to the outer ends of shaft 36' by nuts 106 outwardly of frame plates 30' and 32'. The angular adjustment of the chute receiving portion 20' relative to the frame plates 30' and 32' may be controlled by means of a conventional set screw unit 110. It should be noted that the inner edge of chute receiving portion 100 will always clear the baskets 20' despite the angle assumed by such portion. Outwardly of the periphery of the frame plates 30' and 32' chute receiving portion 20' is provided with a pair of idler rollers 40' utilized for the same purpose as the aforedescribed idler rollers 40, each of such idler rollers 40' being supported from like brackets 112.

The sidewalls of upper end of the chute discharge portion overlaps the sidewalls of chute receiving portion 100, and these sidewalls are provided with aligned, complementary apertures 116. A transversely extending tube 120 is rigidly affixed to the bottom wall 124 of receiving portion 102. Such tube 120 telescopically, slidably receives a pair of like locking pins generally designated 126 and 128. These locking pins each include a main body 130 formed at its outer end with an offset 132 and an inwardly extending peg 134.

The pegs 134 are selectively engagable with the aforedescribed plurality of arcuately arranged apertures 116 by withdrawing the locking pins outwardly relative to tube 120 and then reinserting such pins into their original positions, as indicated in FIG. 12. In this manner the angle between the receiving and discharge portions of chute 20' may be readily adjusted, locking pins 126 and 128 positively maintaining these chute portions at the desired relative angle. Such adjustment permits the chute 20 to accommodate unloading surfaces disposed at varying elevations relative to the fish handling device. With the locking pins partially withdrawn from tube 120 outwardly of apertures 116, the chute discharge portion is free to move vertically as when it rests on a floating dock or boat. Locking pins 126 and 128 may be completely withdrawn from tube 102 to permit the chute discharge portion to be stowed. A lanyard (not shown) may be provided for the locking pins to prevent their loss.

Referring now to FIG. 10, there is shown a unique and economical arrangement for transferring rotational force from the roller 12' to the belt 16'. In this arrangement a plurality of like, equidistantly, circumferentially spaced drive pins, generally designated 140, are affixed to the midportion of the roller 12'. Such pins include a cylindrical head 142 which is carried by a threaded shank 144, with such shank being treadably received within a threaded bore 146, formed in roller 12'. A nut 148 secures the shank within the threaded bore. Each of the drive pins 140 is progressively received by a plurality of complementary apertures 150 formed along the midportion of the belt 16' as the roller 12' undergoes powered rotation. Such apertures 150 are spaced apart substantially the same distance as the spacing between the drive pins 140. This arrangement permits heavy loads of fish to be lifted by the fish-moving baskets 20' without slippage taking place between the belt 16' and the roller 12'.

Referring now to FIG. 11, there is shown an improved form of fish-moving basket 20'. The basket 20' includes a hoop 152 which is affixed to the outer surface of belt 16'. Hoop 152 extends substantially normally from the outer surface of belt 16' and is integrally formed at its radially inner ends with arcuate legs 154 that extend longitudinally along the belt 16' to connect with the outer ends of a rear support rod 156. The curvature of the legs 154 provides for the curvature of the roller 12' as the belt 16' is driven therearound. Hoop 152 and rear support rod 156 are rigidly secured to the belt 16' by suitable clips 160. Instead of the netting 48 employed with the fish-moving baskets 20 of the embodiment of FIGS. 1-7, fish-moving baskets 16' utilize a plurality of arcuate rods 162 that extend between hoop 152 and rear support rod 156 of each basket.

It will be understood that both of the aforedescribed fish handling devices affords safety for the crew of the fishing vessel since such devices can be readily controlled and yet do not require a heavy structure. An additional safety feature is the light weight of such devices as compared to the rigid conveyors of the prior art.

Various modifications and changes may be made with respect to the foregoing detailed description without departing from the spirit of the present invention.

I claim:

1. A fish handling device for lifting fish upwardly out of a fish-containing space, said device comprising:
   a frame;
   a roller mounted on said frame for rotation about a horizontal axis;
   a flexible endless belt drivingly looped about said roller and freely depending therebelow into said fish-containing space, said belt being suspended solely from said roller;
   a plurality of fish-moving baskets attached to said belt at spaced points therealong;
   a chute on said frame spaced outwardly of said baskets; and
   power-operated means on said frame for rotating said roller to thereby cause said baskets to continuously collect and then raise fish out of said fish-containing space onto said chute.

2. A fish handling device as set forth in claim 1 wherein said frame includes a pair of aligned plates between which said roller is supported and one end of said chute is pivotally attached to said plates, said plates being spaced apart wider than the width of said belt.

3. A fish handling device as set forth in claim 1 wherein said frame is provided with idler roller means that urge said belt into driving engagement with said roller.

4. A fish handling device as set forth in claim 1 wherein said chute is provided with an opening spaced outwardly of said baskets and the axial spacing of said baskets on said belt is such that a basket will cover said chute opening during the time fish are dumped from an immediately following basket.

5. A fish handling device as set forth in claim 1 wherein said roller and said belt are formed with complementary grooves.

6. A fish handling device as set forth in claim 1 wherein said roller is formed with a plurality of equidistantly circumferentially spaced drive pins, and said belt is formed with a plurality of apertures spaced apart substantially the same distance as the space between said drive pins, said apertures progressively receiving said drive pins as said roller is rotated.

7. A fish handling device as set forth in claim 2 wherein the outer portions of said belt are covered by arcuate shields formed on the interior surfaces of said plates.

8. A fish handling device as set forth in claim 2 wherein said plates are provided with idler roller means that urge said belt into driving engagement with said roller.

9. A fish handling device as set forth in claim 2 wherein said chute is provided with an opening spaced outwardly of said baskets and the axial spacing of said baskets on said belt is such that a basket will cover said chute opening during the time fish are dumped from an immediately following basket.

10. A fish handling device as set forth in claim 2 wherein said chute includes a receiving portion pivotally attached to said plates and a discharging portion having one of its ends pivotally attached to the end of said receiving portion remote from said plates.

11. A fish handling device as set forth in claim 10 wherein locking means are interposed between the receiving and discharging chute portions to lock said portions together at selected angles or to alternatively permit said discharging portion to pivot vertically relative to said receiving portion.

12. A fish handling device as set forth in claim 11 wherein said locking means include a transverse tube secured to one of said portions, a pair of locking pins slidably carried by said tube and a plurality of aligned apertures formed in said chute portions for selectively receiving said locking pins.

* * * * *